US008718364B2

(12) United States Patent
Enomoto

(10) Patent No.: US 8,718,364 B2
(45) Date of Patent: May 6, 2014

(54) APPARATUS AND METHOD FOR DIGITIZING DOCUMENTS WITH EXTRACTED REGION DATA

(75) Inventor: Makoto Enomoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 12/980,678

(22) Filed: Dec. 29, 2010

(65) Prior Publication Data

US 2011/0164813 A1 Jul. 7, 2011

(30) Foreign Application Priority Data

Jan. 6, 2010 (JP) ................................. 2010-001426

(51) Int. Cl.
*G06K 9/34* (2006.01)
(52) U.S. Cl.
USPC ........... 382/173; 382/100; 382/176; 382/177; 358/474; 358/505; 715/212; 715/217; 715/227; 715/243; 715/273
(58) Field of Classification Search
None
See application file for complete search history.

(56) References Cited

U.S. PATENT DOCUMENTS

| 5,680,478 | A | 10/1997 | Wang et al. | |
|---|---|---|---|---|
| 5,680,479 | A | 10/1997 | Wang et al. | |
| 5,867,159 | A * | 2/1999 | Hamada et al. | 345/443 |
| 6,337,924 | B1 * | 1/2002 | Smith | 382/190 |
| 6,816,630 | B1 * | 11/2004 | Werth et al. | 382/287 |
| 7,532,757 | B2 * | 5/2009 | Yoshida et al. | 382/180 |
| 7,913,191 | B2 * | 3/2011 | Asakawa et al. | 715/853 |
| 2005/0111053 | A1 * | 5/2005 | Yoshida et al. | 358/448 |
| 2005/0238244 | A1 | 10/2005 | Uzawa | |
| 2007/0277090 | A1 * | 11/2007 | Raja et al. | 715/503 |
| 2008/0040513 | A1 * | 2/2008 | Asakawa et al. | 710/1 |
| 2008/0143735 | A1 * | 6/2008 | Besley et al. | 345/582 |
| 2008/0144942 | A1 * | 6/2008 | Besley et al. | 382/209 |
| 2008/0189600 | A1 * | 8/2008 | Lau et al. | 715/235 |
| 2008/0270884 | A1 * | 10/2008 | Rehm | 715/224 |

(Continued)

FOREIGN PATENT DOCUMENTS

| JP | 11-167532 A | 6/1999 |
|---|---|---|
| JP | 11-312231 A | 11/1999 |

(Continued)

OTHER PUBLICATIONS

Machine language translation of the document (JP 2002007953 A)—translated on Feb. 21, 2013.*

(Continued)

*Primary Examiner* — Matthew Bella
*Assistant Examiner* — Jason Heidemann
(74) *Attorney, Agent, or Firm* — Fitzpatrick, Cella, Harper & Scinto

(57) ABSTRACT

An apparatus according to the present invention comprises: a region extraction unit configured to extract region data for each object from document image data including tables; a table structure analysis unit configured to analyze the region data relating to table objects out of the extracted region data and extract table structure information on each of the table objects; a sheet generation unit configured to generate a display sheet for reproducing a layout of the object in the document image data and an edit sheet for each table for editing the table, by using the region data and the table structure information on each object; and an electronic-document generation unit configured to generate an electronic document which associated the display sheet with the edit sheet.

9 Claims, 18 Drawing Sheets

(56) References Cited

U.S. PATENT DOCUMENTS

| | | | |
|---|---|---|---|
| 2009/0016605 A1* | 1/2009 | Chao et al. | 382/176 |
| 2009/0087094 A1* | 4/2009 | Deryagin et al. | 382/180 |
| 2010/0100803 A1 | 4/2010 | Okushiro et al. | |

FOREIGN PATENT DOCUMENTS

| | | |
|---|---|---|
| JP | 2002-007953 A | 1/2002 |
| JP | 2002-185763 A | 6/2002 |
| JP | 2004-086436 A | 3/2004 |
| JP | 2005-086436 A | 3/2004 |
| JP | 2005-346137 A | 12/2005 |
| WO | 2009/001462 A | 12/2008 |

OTHER PUBLICATIONS

MrExcel. 'Splitting worksheet data into multiple worksheets'. In MrExcel Forum [online], Jun. 2002, [retrieved on Aug. 11, 2013]. Retrieved from the Internet: <URL:http://www.mrexcel.com/forum/excel-questions/10206-splitting-worksheet-data-into-multiple-worksheets.html>.*

French. 'Excel 2007 Spreadsheet Print Options' In About.com Guide [online], [retrieved on Aug. 11, 2013]. Retrieved from the Internet: <URL:http://spreadsheets.about.com/od/excel101/ss/2010-08-22-Excel-2007-Spreadsheet-Print-Options1_4.htm>.*

French. 'Parts of the Excel 2007 Screen' In About.com Guide [online], [retrieved on Aug. 11, 2013]. Retrieved from the Internet: <URL:http://spreadsheets.about.com/od/excel101/ss/2010-08-22-Excel-2007-Spreadsheet-Print-Options1_4.htm>.*

Chinese Office Action dated Nov. 29, 2012 in counterpart Chinese Patent Application No. 201110008963.2.

Chinese Second Office Action dated May 27, 2013 in counterpart Chinese Patent Application No. 201110008963.2.

Chinese Notice in the Third Office Action dated Oct. 22, 2013 in Chinese counterpart Appln. No. 201110008963.2.

Japanese Office Action dated Oct. 8, 2013 in counterpart Japanese Patent Application No. 2010-001426.

* cited by examiner

| | TABLE REGION 601 | | | TABLE STRUCTURE (CONSTITUENT CELL) 602 | | | |
|---|---|---|---|---|---|---|---|
| | COORDINATE S (x, y) | SIZE (w, h) | INCLINATION (°) | ROW/COLUMN COORDINATES (c, r) | RECTANGLE (x, y-h, h) | BACKGROUND | LINE |
| TABLE REGION 502 | 90, 550 | 2200, 570 | 0 | 1, 1 | 0, 0-580, 190 | NONE | BLACK, SOLID LINE |
| | | | | 2, 1 | 580, 0-870, 190 | NONE | BLACK, SOLID LINE |
| | | | | 3, 1 | 1450, 0-750, 190 | NONE | BLACK, SOLID LINE |
| | | | | 1, 2 | 0, 190-580, 190 | NONE | BLACK, SOLID LINE |
| | | | | 2, 2 | 580, 190-870, 190 | NONE | BLACK, SOLID LINE |
| | | | | 3, 2 | 1450, 190-750, 190 | NONE | BLACK, SOLID LINE |
| | | | | 1, 3 | 0, 380-580, 190 | NONE | BLACK, SOLID LINE |
| | | | | 2, 3 | 580, 380-870, 190 | NONE | BLACK, SOLID LINE |
| | | | | 3, 3 | 1450, 380-750, 190 | NONE | BLACK, SOLID LINE |
| TABLE REGION 503 | 420, 1630 | 1350, 540 | 0 | 1, 1 | 0, 0-600, 180 | NONE | BLACK, SOLID LINE |
| | | | | 2, 1 | 600, 0-750, 180 | NONE | BLACK, SOLID LINE |
| | | | | 1, 2 | 0, 180-600, 180 | NONE | BLACK, SOLID LINE |
| | | | | 2, 2 | 600, 180-750, 180 | NONE | BLACK, SOLID LINE |
| | | | | 1, 3 | 0, 360-600, 180 | NONE | BLACK, SOLID LINE |
| | | | | 2, 3 | 600, 360-750, 180 | NONE | BLACK, SOLID LINE |

FIG.6

|  | RECTANGLE (x, y-w, size) or (c, r-size) | RECOGNITION RESULT |
|---|---|---|
| CHARACTER REGION 501 | 170, 120-1050, 180 | "Member List" |
| TABLE REGION 502 | 1, 1-45 | "Name" |
|  | 2, 1-45 | "Email" |
|  | 3, 1-45 | "Group" |
|  | 1, 2-45 | "Maruko Taro" |
|  | 2, 2-45 | "marukot@xxx.co.jp" |
|  | 3, 2-45 | "A" |
|  | 1, 3-45 | "Kosugi Ichiro" |
|  | 2, 3-45 | "kosugii@xxx.co.jp" |
|  | 3, 3-45 | "B" |
| TABLE REGION 503 | 1, 1-45 | "Group" |
|  | 2, 1-45 | "Leader" |
|  | 1, 2-45 | "A" |
|  | 2, 2-45 | "Maruko Taro" |
|  | 1, 3-45 | "B" |
|  | 2, 3-45 | "Kosugi Ichiro" |

FIG.7

```
<Sheet name= "Viewsheet" >
 <Table/>
 <Shapes>
  <Text x= "170" y= "120" fontSize = "180" >Members List</Text>
 </Shapes>
</Sheet>
```

FIG.8A

```
<Sheet name= "Viewsheet" >
 <Table/>
 <Shapes>
  <Image x= "90" y= "550" >
   <Script>
    ThisWorkbook.Sheet( "TableEditSheet1" ).getRenderImage();
   </Script>
  </Image>
  <Image x= "420" y= "1630" >
   <Script>
    ThisWorkbook.Sheet( "TableEditSheet2" ).getRenderImage();
   </Script>
  </Image>
  <Text x= "170" y= "120" fontSize = "180" >Members List</Text>
 </Shapes>
</Sheet>
```

FIG.8B

```
<Sheet name= "TableEditSheet1" >
 <Table>
  <Column c= "1" width= "580" />
  <Column c= "2" width= "870" />
  <Column c= "3" width= "750" />
  <Row r= "1" Height= "190" />
   <Cell c= "1" type= "string" fontHeight= "45" value= "Name" borderColor= "#000" />
   <Cell c= "2" type= "string" fontHeight= "45" value= "Email" borderColor= "#000" />
   <Cell c= "3" type= "string" fontHeight= "45" value= "Group" borderColor= "#000" />
  </Row>
  <Row r= "2" height= "190" >
   <Cell c= "1" type= "string" fontHeight= "45" value= "Maruko Taro" borderColor= "#000" />
   <Cell c= "2" type= "string" fontHeight= "45" value= "marukot@xxx.co.jp" borderColor= "#000" />
   <Cell c= "3" type= "string" fontHeight= "45" value= "A" borderColor= "#000" />
  </Row>
  <Row r= "3" height= "190" >
   <Cell c= "1" type= "string" fontHeight= "45" value= "Kosugi Ichiro" borderColor= "#000" />
   <Cell c= "2" type= "string" fontHeight= "45" value= "kosugii@xxx.co.jp" borderColor= "#000" />
   <Cell c= "3" type= "string" fontHeight= "45" value= "B" borderColor= "#000" />
  </Row>
 </Table>
 <Shapes/>
</Sheet>
```

FIG.9A

```
<Sheet name= "TableEditSheet2" >
 <Table>
  <Column c= "1" width= "6000" />
  <Column c= "2" width= "750" />
  <Row r= "1" height= "180" />
   <Cell c= "1" type= "string" fontHeight= "45" value= "Group" borderColor= "#000" />
   <Cell c= "2" type= "string" fontHeight= "45" value= "Leader" borderColor= "#000" />
  </Row>
  <Row r= "2" height= "180" >
   <Cell c= "1" type= "string" fontHeight= "45" value= "A" borderColor= "#000" />
   <Cell c= "2" type= "string" fontHeight= "45" value= "Maruko Taro" borderColor= "#000" />
  </Row>
  <Row r= "3" height= "180" >
   <Cell c= "1" type= "string" fontHeight= "45" value= "B" borderColor= "#000" />
   <Cell c= "2" type= "string" fontHeight= "45" value= "Kosugi Ichiro" borderColor= "#000" />
  </Row>
 </Table>
 <Shapes/>
</Sheet>
```

FIG.9B

```
<Workbook>
 <Sheets>
   <Sheet num=" 1" ref=" ViewSheet.xml" >
   <Sheet num=" 2" ref=" TableEditSheet1.xml" >
   <Sheet num=" 3" ref=" TableEditSheet2.xml" >
 </Sheets>
</Workbook>
```

| | 1 | 2 | 3 | 4 |
|---|---|---|---|---|
| 1 | Name | Email | Group | |
| 2 | Maruko Taro | marukot@xxx.co.jp | A | |
| 3 | Kosugi Ichiro | kosugii@xxx.co.jp | B | |
| 4 | | | | |
| 5 | | | | |
| 6 | | | | |
| 7 | | | | |
| 8 | | | | |
| 9 | | | | |

View_ / Table_1 / Table_2

FIG.12B

| | 1 | 2 | 3 | 4 |
|---|---|---|---|---|
| 1 | Group | Leader | | |
| 2 | A | Maruko Taro | | |
| 3 | B | Kosugi Ichiro | | |
| 4 | | | | |
| 5 | | | | |
| 6 | | | | |
| 7 | | | | |
| 8 | | | | |
| 9 | | | | |

View_ / Table_1 / Table_2

FIG.13A

|   | 1 | 2 | 3 | 4 | 5 | 6 | 7 |
|---|---|---|---|---|---|---|---|
| 1 | | | Members List | | | | |
| 2 | | Name | Email | | Group | | |
| 3 | | Maruko Taro | marukot@xxx.co.jp | | A | | |
| 4 | | Kosugi Ichiro | kosugii@xxx.co.jp | | B | | |
| 5 | | | | | | | |
| 6 | | | Group | Leader | | | |
| 7 | | | A | Maruko Taro | | | |
| 8 | | | B | Kosugi Ichiro | | | |

FIG.13B

|   | 1 | 2 | 3 | 4 | 5 | 6 | 7 |
|---|---|---|---|---|---|---|---|
| 1 | | | Members List | | | | |
| 2 | | Name | Email | | Group | | |
| 3 | | Maruko Taro | marukot@xxx.co.jp | | A | | |
| 4 | | Kosugi Ichiro | kosugii@xxx.co.jp | | B | | |
| 5 | | | | | | | |
| 6 | | | Group | Leader | | | |
| 7 | | | A | Maruko Taro | | | |
| 8 | | | B | Kosugi Ichiro | | | |

|   | 1 | 2 | 3 | 4 |
|---|---|---|---|---|
| 1 | Name | Email | Group | |
| 2 | Maruko Taro | marukot@xxx.co.jp | A | |
| 3 | Kosugi Ichiro | kosugii@xxx.co.jp | B | |
| 4 | | | | |

|  |  | CONDITION |
|---|---|---|
| WORKBOOK DOCUMENT SPECIFICATION | INCLINATION | GENERATE EDIT SHEET IN CASE EXCEPT 0, 90, 180, AND 270 DEGREES |
| | CELL BACKGROUND | GENERATE EDIT SHEET IN CASE EXCEPT SINGLE COLOR |
| TABLE AND OTHER OBJECTS | POSITIONAL RELATIONSHIP | GENERATE EDIT SHEET WHEN OVERLAPPING OF TABLE REGIONS |
| RELATIONSHIP BETWEEN TWO TABLES | POSITIONAL RELATIONSHIP | GENERATE EDIT SHEET WHEN EITHER RANGES IN X DIRECTION OR RANGES IN Y DIRECTION ARE OVERLAPPED |

FIG.17

APPARATUS AND METHOD FOR DIGITIZING DOCUMENTS WITH EXTRACTED REGION DATA

BACKGROUND OF THE INVENTION

1. Field of the Invention

This invention relates to an apparatus and a method for digitizing paper documents.

2. Description of the Related Art

In recent years, spread of networks as typified by the Internet has increased the opportunity to digitally distribute documents, but documents in a printed paper form are still often distributed. In this circumstance, techniques have been contemplated for, even when there is only a paper document at hand, obtaining the contents of the document as reusable data for a long time.

For example, there is a technique of reading a paper document by a scanner or the like transmitting the resulting image data from a terminal to a server, and causing the server to recognize and convert the data into a reusable form, and then to return the resulting data to the terminal (see Japanese Patent Laid-Open No. H11-167532 (1999)).

In another technique, the image data of the document is divided into regions according to a type, such that the data can be output individually on a region basis (see Japanese Patent Laid-Open No. 2005-346137).

When a document image (image data) generated by scanning a paper document is subjected to a document digitization process, a user desires different data formats according to his purpose or use. At all events, many users desire that a document is digitized into a convenient format.

For example, when a document includes a table, a user who wants to perform on the table an edit operation involving insertion/deletion of rows/columns desires to digitize the document such that the electronic document includes an editable table as a table object. On the other hand, a user who wants to re-print the document without a change for use as a paper document desires to digitize the document such that visual information on a table line layout and the like is reproduced as faithfully as possible.

However, in some format specifications of electronic documents, when a table in the document image is converted into a table object, a table structure or a table line layout may not be reproduced as it is.

Also, in the method of rendering the table as a vector object in order to reproduce the visual information on the table, the editing operation involving insertion/deletion of rows/columns is disabled.

When calculations and the like are performed using values in cells in the table with reference to the table structure, the table is preferably reproduced in a spreadsheet application format (format that expresses the table structure based on a cell matrix structure). However, in the format that expresses the table structure based on the cell matrix structure, when the same page (sheet) contains a plurality of tables, an editing operation performed on one of the tables may unintentionally affect another table.

FIG. 13A shows the state of two tables, a table 1311 and a table 1312, in total existing on the same sheet. Since a boundary between the cells falls on a line position in the spreadsheet application or the like, merging of cells and the like are performed in order to reproduce the two tables. FIG. 13B shows the result of the operation of adding a new column on the right side of a cell 1313 performed on a sheet edit window 1313 in the above condition. It is seen that the new column 1321 is inserted on the right side of the cell 1313 in the table 1311, but simultaneously an unintentional column 1322 is inserted in the table 1312 as well. In the other operations of deleting a column, changing the cell width and the like, if the edit operation is performed on one table, the other table is unintentionally affected.

Until now, it is difficult to achieve digitization of paper documents which can simultaneously fulfill various requests of the user without any problems as described above.

SUMMARY OF THE INVENTION

An apparatus according to the present invention comprises: a region extraction unit configured to extract region data containing details of a region occupied by a table object included in document image data; a table structure analysis unit configured to analyze the region data relating to the table object and to extract table structure information relating to the table object; a sheet generation unit configured to generate a display sheet for reproducing an appearance of the table object in the document image data and an edit sheet for each table object for editing the table, by using the region data and the table structure information related to the table object; and an electronic-document generation unit configured to generate an electronic document in which the display sheet is associated with the edit sheet.

An electronic document (workbook document) according to the present invention includes an edit sheet and a print display sheet. This makes it possible to faithfully reproduce a document layout for a document including tables and also ensure convenience of table edits.

Further features of the present invention will become apparent from the following description of exemplary embodiments (with reference to the attached drawings).

BRIEF DESCRIPTION OF THE DRAWINGS

FIG. 6 is a diagram showing examples of table region information and table structure information;

FIG. 7 is a diagram showing an exemplary result of character recognition processing;

FIGS. 8A and 8B are diagrams showing an exemplary display sheet;

FIGS. 9A and 9B are diagrams showing an exemplary edit sheet;

FIG. 10 is a diagram showing an exemplary workbook document;

FIGS. 12A and 12B are diagrams showing an exemplary edit sheet displayed by a display/editing program;

FIGS. 13A and 13B are diagrams illustrating the related art;

FIGS. 15A and 15B are diagrams showing the state of displaying the edit sheet and the display sheet by the display/editing program;

FIG. 17 is a diagram showing an exemplary determination table; and

DESCRIPTION OF THE EMBODIMENTS

Embodiment 1

Figure 1:
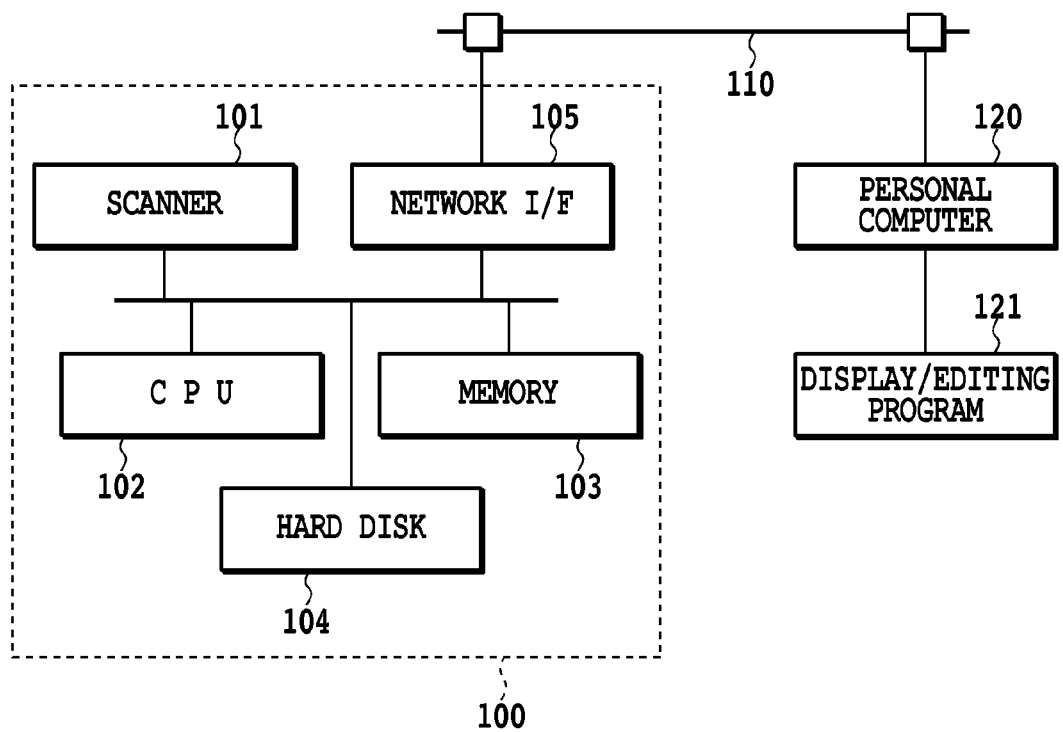
FIG. 1 is a diagram showing an exemplary system configuration according to embodiment 1.

FIG. 1 is a diagram showing an exemplary system configuration according to the embodiment.

Reference numeral 100 denotes an image processing apparatus.

Reference numeral 101 denotes a scanner serving as reading means for scanning a paper document to obtain a document image (image data).

Reference numeral 102 is a CPU that executes digitization processing programs for performing various types of processing according to the present invention on the obtained image data.

Reference numeral 103 denotes a memory used, for example, for temporarily storing work memories and data when the CPU 102 executes the digitization processing program.

Reference numeral 104 denotes a hard disk storing the digitization processing program and data.

Reference numeral 105 denotes a network I/F for receiving/transmitting data from/to an external device.

Reference numeral 110 denotes a network (LAN).

Reference numeral 120 denotes a personal computer (PC), which is connected to the image processing apparatus 100 through the LAN 110.

Reference numeral 121 denotes a display/editing program enabling an electronic document generated by the image processing apparatus 100 to be displayed on the display of the PC 120 for users to edit it.

Figure 2:
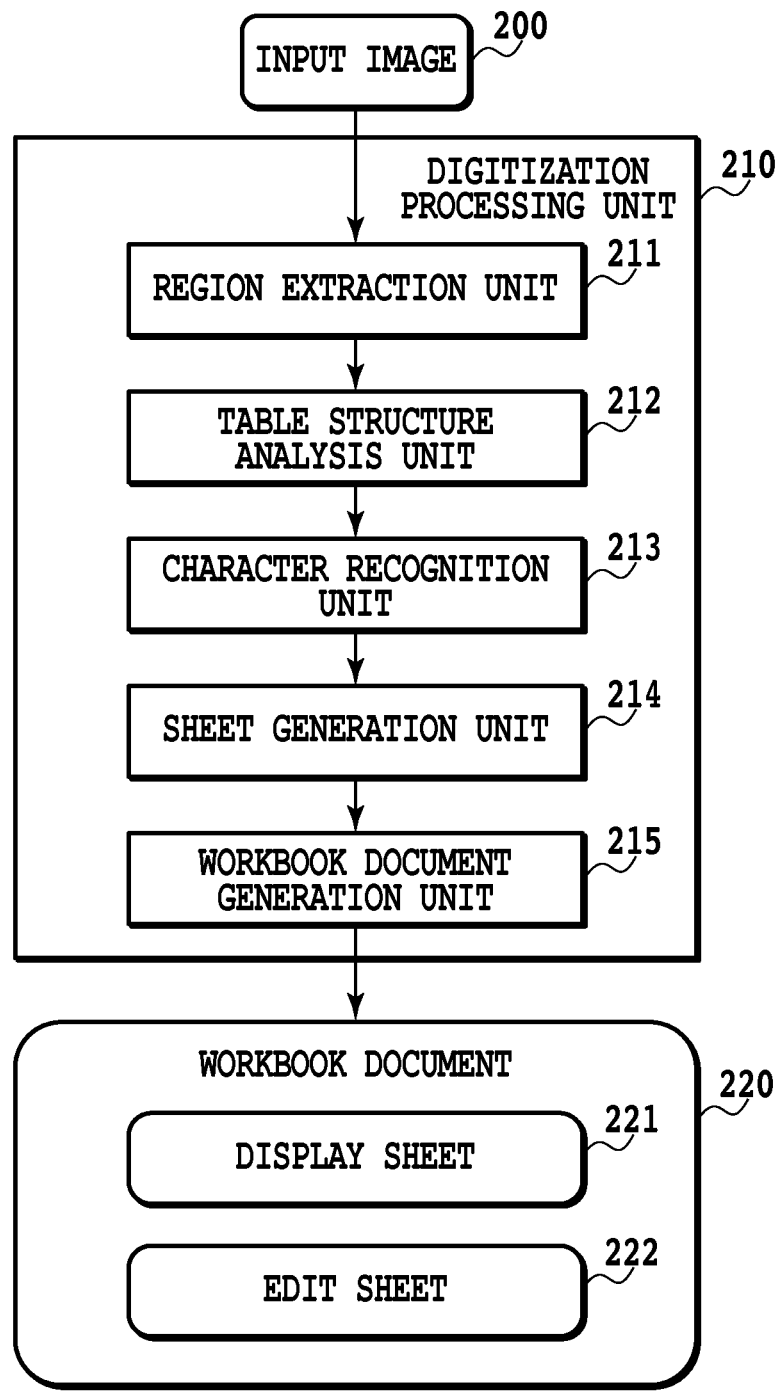
FIG. 2 is a functional block diagram illustrating the operation in embodiment 1.

FIG. 2 is a functional block diagram illustrating an operation in the embodiment.

Assuming that each unit illustrated in FIG. 2 is implemented by execution of the digitization processing program by the CPU 102, but a part of or all of them may be configured by electric circuits.

Reference numeral 200 denotes image data obtained as a result of reading paper documents by the scanner 101.

Reference numeral 210 denotes a digitization processing unit that performs digitization processing on the received image data 200.

Reference numeral 220 denotes a workbook document generated by the digitization processing unit 210. In this regard, term "workbook document" in the specification refers to an electronic document which can be displayed and edited by the display/editing program 121 stored in the PC 120, and includes a plurality of sheets. The display/editing program 121 in the specification is a spreadsheet application (for example, Microsoft Office Excel®. The sheet (spreadsheet) is electronic data in which a table layout can be represented by a table structure organized into minimum units of columns and rows referred to as cells and by the other objects which can be freely arranged (floating objects). In this regard, the workbook document described in the embodiment is written in an XML (Extensible Markup Language) format. It should be understood that the XML format is one example, and an application-specific binary format may be employed.

Each of the blocks 211 to 215 schematically shows each function executed by the digitization processing unit 210 as an independent component.

Reference numeral 211 denotes a region extraction unit that analyzes the received document image (image data), then divides the resulting image into regions according to object types such as a table, a character, a natural image and the like, and then extracts the region data on an object basis. The region data includes object type information, and also information on object positions, object sizes, object inclination and the like. In this regard, for the sake of easier understanding, the region data of a table object is simply referred to as "table region data" and the region data of a character object is simply referred to as "character region data".

Reference numeral 212 denotes a table structure analysis unit that analyzes the table structure in the table region data extracted by the region extraction unit 211 and then extracts and generates table structure information.

Reference numeral 213 denotes a character recognition unit that recognizes characters in the character region data and generates character recognition information including character code data.

Figure 3:
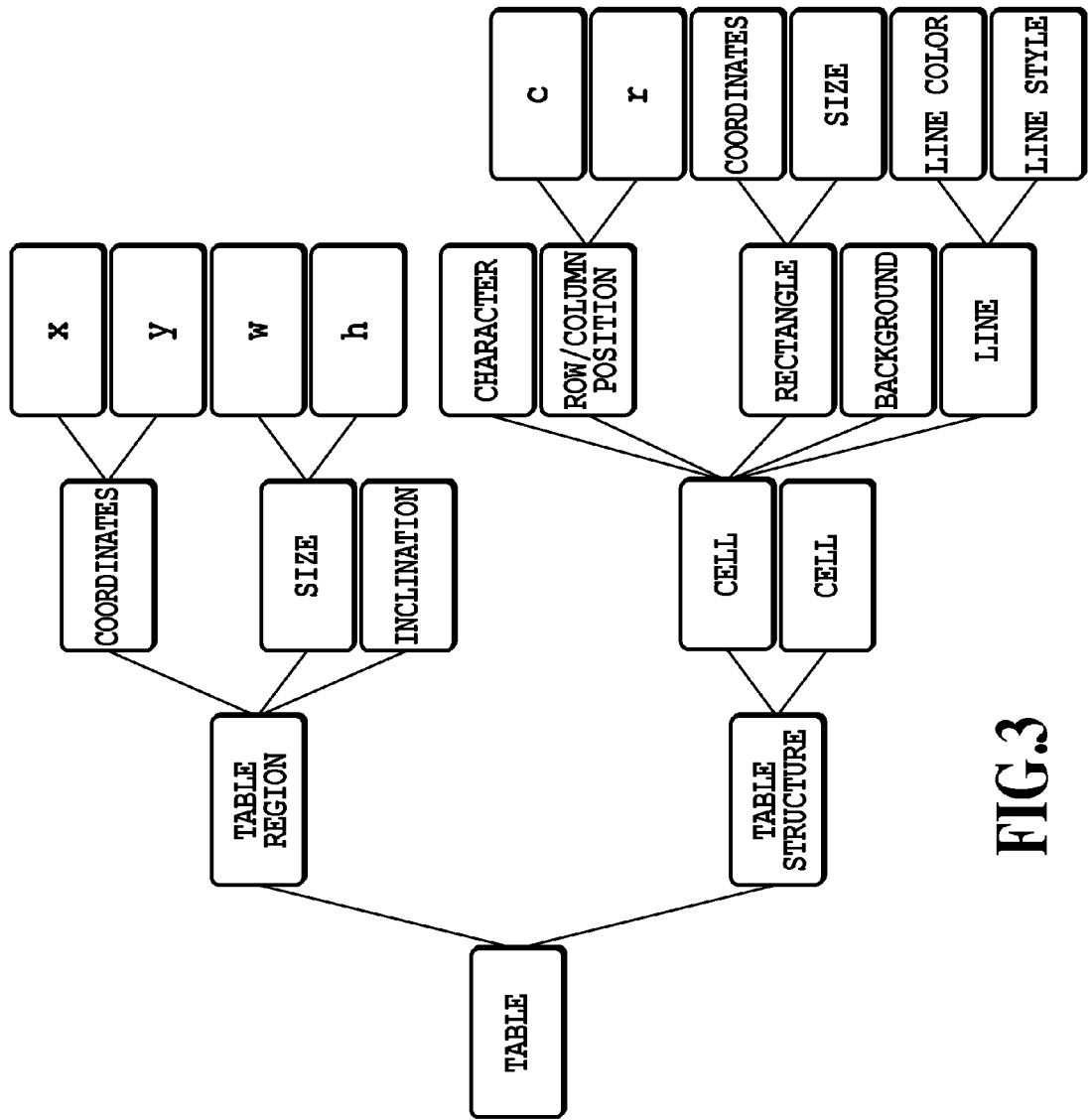
FIG. 3 is a tree structure diagram of information relating to a table object.

FIG. 3 is a tree structure diagram showing information on the table object obtained through the region extraction processing, the table structure analysis processing and the character recognition processing. The information relating to the table is firstly roughly divided into two, the table region information and the table structure information.

The table region information is obtained by the region extraction processing. The table region information is then grouped into coordinate information, size information and inclination information regarding the rectangular shape forming the outer frame of the table. The coordinate information represents coordinates of the top left position of the rectangular shape forming the outer frame of the table on the assumption that the top left point of the document image is defined as the origin point (0, 0). Coordinates (x, y) made up of a position x in the horizontal axis direction and a position y in the vertical axis direction are used for expression of coordinate information. The size information represents a size of the rectangular shape forming the outer frame of the table, including information (w, h) describing a width w and a height h. The inclination information is information concerning how much a vertical line segment of a table is inclined with respect to a vertical direction of a document, which is expressed in degrees (°).

The table structure information is obtained by the table structure analysis processing. The table structure information is a collection of information (cell information) on cells separately defined by rows and columns which are the smallest unit of the table. The cell information is in turn grouped into character code data, row-column coordinate information, rectangle information, background information, line information (ruled line information), and the like. The row-column coordinate information includes information (c, r) indicating a position of a cell by a column c and a row r. The rectangle information includes a combination (x, y-w, h) of information (horizontal axis position x, vertical axis position y) indicating the top left position of a cell on the assumption that the top left point of the rectangular shape forming the outer frame of the table is defined as the origin point (0, 0) and information (width w, height h) indicating a size of the cell. The background information is information about a color, a pattern and the like of the background of the cell. The line information is information indicating a color, a line style (e.g., a solid line, a dotted line, a heavy line, a thin line, and a double line), and the like of a line segment of the cell.

Region information corresponding to the above-described table region information exists in relation to another object (e.g., character region information and the like), and is managed and stored in a similar tree structure. In this regard, the tree structure is one technique for managing information about a table, and similar information may be managed and stored by another technique.

Reference numeral 214 denotes a sheet generation unit that generates a display sheet 221 and an edit sheet 222 on the basis of the region data obtained for each object.

Reference numeral 215 denotes a workbook document generation unit that generates a workbook document 220 as an electric document from the sheet generated by the sheet generation unit 214. The workbook document 220 includes the display sheet 221 and the edit sheet 222 which are page units in the workbook document. The workbook document 220 can be displayed or edited by the display/editing program 121 in the PC 120.

The display sheet 221 is electric data used to display a document image on the display of the PC 120 and print it on a printer which is not shown. Since the display sheet 221 is a sheet used for placing prime importance to a layout of an object in a document image and displaying the image without a change in layout, it is called "display sheet".

The edit sheet 222 is electric data used to perform, on a table included in a document image, an edit operation in which, for example, a column is added or a row is deleted. Since the edit sheet 222 is a sheet used for editing a table in a document image, it is called "edit sheet".

The following details are given of specific steps of the processing of each function (each processing unit) of the electronic-document generation unit 210.

(Region Extraction Unit)

The image data received through the scanner 101 is first divided into regions on an object basis in the region extraction unit 211, and the region data for each object is extracted. For the extraction, known methods such as one described in U.S. Pat. No. 5,680,478, are applicable. In the case of employing the method described in U.S. Pat. No. 5,680,478, blocks of black pixels and white pixels are extracted from the image data, and then a region for each of the objects, which are classified by types such as characters, pictures, drawings, tables, nature images, frames and lines, is extracted based on the shape, size, collecting state and the like. It should be noted that, as a method of extracting a table from an image data, there is a method of performing Hough transform or the like on the input image data to extract line-segment information, in which case a detection of a table inclined with respect to the document is possible.

Upon extracting the region, information about a position (layout), a size, an inclination and the like of the object is extracted as well. A table object is described by way of example. In addition to the above-described table region information, that is, to coordinate information and size information of a rectangular shape forming an outer frame of the table, inclination information representing how much the table is inclined with respect with the document is also extracted. That is, the region data includes information about a type, a position, a size and an inclination of the object and the like.

Figure 5:
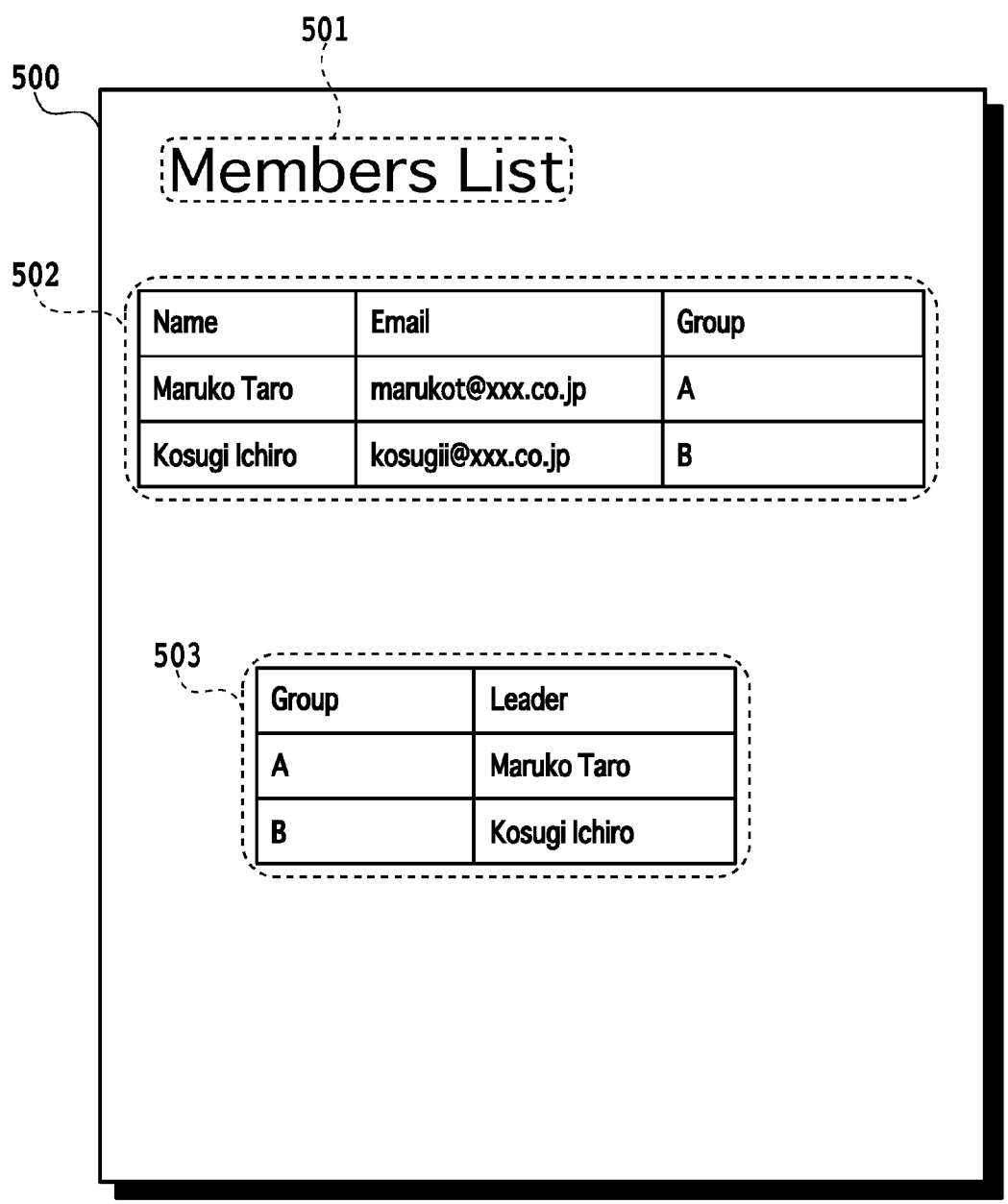
FIG. 5 is an exemplary document image read by a scanner.

Reference numeral 500 in FIG. 5 denotes an example of document images read by the scanner 101. Reference numeral 501 denotes a region extracted as a character region, and reference numerals 502 and 503 denote regions extracted as table regions, respectively.

Then, reference numeral 601 in FIG. 6 denotes table region information extracted about the table regions 502 and 503 along with them. Concerning the table region 502, coordinate information (90, 550) of the top left position of the rectangular shape forming the outer frame of the table, and size information (2200, 570) representing a width and a height of the rectangular shape are shown. In addition, since a line segment in the vertical direction of the table region 502 is parallel to the vertical direction of the document image 500, the inclination information represents "0°". Concerning the table region 503, coordinate information (420, 1630) of the top left position of the rectangular shape forming the outer frame of the table, and size information (1350, 540) representing a width and a height of the rectangular shape are shown. Similarly, the inclination information represents "0°".

(Table Structure Analysis Unit)

Upon completion of the extraction of the region data for each object, the table structure analysis unit 212 then analyzes the table region data to extract table structure information such as a row column structure of the table, coordinates of the cells, a color and a style of lines and the like. Concerning a method of analyzing the table region data to extract the table structure information, there is, for example, the method described in Japanese Patent Laid-open No. 2004-086436, and the like. In this method, first, edges in two directions are calculated in the vicinity of the boundary of a block of white pixels within the table region, and then partial line information is obtained based on an edge histogram calculated from each of the calculated edges in the two directions. Based on the partial line information thus obtained, the table structure is analyzed by obtaining line information of the table region.

Reference numeral 602 in FIG. 6 denotes table structure information extracted about the table regions 502 and 503. Concerning the table region 502, coordinates (0, 0) of the top left position of the rectangle and size (580, 190) of the rectangle of the cell located in the first row and the first column are shown when the top left of the rectangle forming the outer frame of the table region is defined as the origin point (0, 0). In addition, "none" is shown as the background information and "a black and solid line" is shown as the line information. Similar information relating to cells (9 cells in total) until the third-row and third-column cell is shown. Concerning the table region 503, coordinates (0, 0) of the top left position of the rectangle and size (600, 180) of the rectangle of the cell located in the first row and the first column, and "none" is shown as the background information and "a black and solid line" is shown as the line information. Similar information relating to cells (6 cells in total) until the third-row and second-column cell is shown.

(Character Recognition Unit)

Upon completion of the analysis of the table structure, the character recognition unit 213 performs character recognition processing on a cell range based on the character region data and the table region data. Known character recognition techniques can be employed for the character recognition processing. An example of character recognition performed on the character region data will be described below.

First, regarding the character region data, the character recognition unit 213 determines whether character orientation is horizontal or vertical, that is, which direction rows extend in. As the determination technique, there are a method of binarizing image data, then measuring vertical and horizontal projections, and then determining a direction with a lower distribution of projections as a row direction, and the like.

Next, the character region data is divided into sets of image data on a character-by-character basis. Specifically, projections in the row direction of the binary image are used to find the boundary between rows to be cut, thus dividing the character region data into sets of image data on a row-by-row basis (row image data). Then, projections in the direction perpendicular to the row are used to find the boundary between characters to be cut, thus dividing the row image data into sets of image data on a character-by-character basis (character image data).

Subsequently, features are read from each divided set of character image data, and then a dictionary in advance storing features of all character types is used to retrieve features closest to the read features. Then, a character code of a character type having the closest features thus retrieved is a character recognition result of the character image data.

Further, upon recognizing a character in each set of character image data, information on a size of the character is also simultaneously acquired, and calculates a mean value of sizes of all the characters existing in the character region data. In this manner, character size information is calculated for each set of the character region data. The character code data and the character size information thus obtained are combined to generate character recognition information in relation to the character region data.

Similar processing is performed on the cell range in the table region data for each of the cells forming the table. When the region extraction unit 211 has acquired the character region data about the characters in the table from the extracted table region data, the character recognition processing may be performed on the acquired character region data.

FIG. 7 shows the result of the character recognition processing performed on the image data on the three regions 501 to 503 shown in FIG. 5.

In the character region 501, a character string "Member List" as the recognition result, the position and size information (170, 120 to 1050) of a rectangular shape forming the outer frame of the character region 501, and character size information (180) are shown.

About the table region 502 in FIG. 7, a character string "Name" and character size information "45" (pixel) are shown for the first-column and first-row cell. Likewise, a character string "Email" is shown in the second-column and first-row cell. A character string "Group" is shown in the third-column and first-row cell. A character string "Maruko Taro" is shown in the first-column and second-row cell. A character string marukot@xxx.co.jp is shown in the second-column and second-row cell. A character string "A" is shown in the third-column and second-row cell. A character string "Kosugi Ichiro" is shown in the first-column and third-row cell. A character string kosugii@xxx.co.jp is shown in the second-column and third-row cell, and a character string "B" is shown in the third-column and third-row cell. Further, a character string "Group" is shown in the first-column and first-row cell in the table region 503. Then, a character string "Leader" is shown in the second-column and first-row cell. A character string "A" is shown in the first-column and second-row cell. A character string "Maruko Taro" is shown in the second-column and second-row cell. A character string "B" is shown in the third-column and first-row cell, and a character string "Kosugi Ichiro" is shown in the third-column and second-row cell. Then, 45 (pixel) is shown as character size information of the above-described character string extracted from each cell of the table regions 502 and 503.

(Sheet Generation Unit)

Upon completion of the character recognition processing, the sheet generation unit 214 executes the processing of generating the display sheet 221 and the edit sheet 222.

Prior to a description of the flow of the processing in the sheet generation unit 214, each element written on the sheet will be described in detail. FIG. 8 and FIG. 9 will be referred to as required.

A Sheet element which is a root element of a sheet format includes a Table element storing cell information and a Shapes element storing information on a floating object which can be freely placed on the sheet. The Name attribute of the Sheet element represents a sheet name.

A Text element of a Shapes sub-element is an element that handles character string information, which includes the "x" attribute and the "y" attribute showing a top left position of a rendering when a top left of a sheet is defined as an origin point (0, 0), the fontSize attribute that specifies a size of a character, and character information for identifying a character to be displayed. An Image element of the Shapes sub-element is an element that handles an image object, which stores the "x" attribute and the "y" attribute showing a top left position of a rendering when a top left of a sheet is defined as an origin point (0, 0), and image data as the contents of an image object.

A Table element includes a Column element storing column information, and a Row element storing row information. The Column element includes the "c" attribute representing a column number and the width attribute representing a column width. The Row element includes the "r" attribute representing a row number, the height attribute representing a height, and a sub-element Cell.

The Cell element corresponds to a cell on the sheet. The Cell element includes the "c" attribute representing which column (column element) the cell corresponds to, the type attribute representing an attribute of a value, the fontSize attribute representing a font size, the value attribute representing a value of the cell, and the borderColor attribute representing a color of a line.

Figure 4:
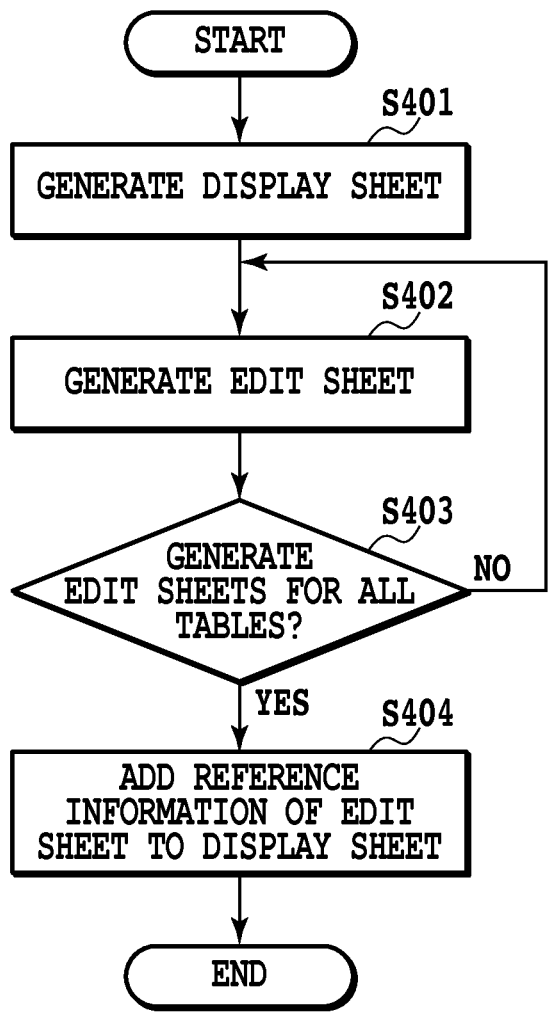
FIG. 4 is a flowchart illustrating the flow of processing in a sheet generating unit.

Next, the flow of the processing in the sheet generation unit 214 will be described in detail with reference to the flowchart in FIG. 4.

First, at step 401, the sheet generation unit 214 generates a display sheet with a description of objects except a table. Specifically, objects of characters, natural image and/or the like are expressed on a separate layer from a cell layer as a floating object which can be freely placed, thus generating a sheet in which an object layout in a document is reproduced.

FIG. 8A is an exemplary display sheet with a description of a character object of the character region 501 in the document image 500 shown in FIG. 5. It is seen that the sheet has text elements of character strings which are identified by "viewsheet" as a sheet name, x="170", y="120", and fontSize="180" as position and size information of a rectangle of the character region, and "Member List" as contents.

It should be noted that, in the case of the document image 500, only the character object exists as an object other than the table. However, if another image or object of a graphic form, a natural image or the like exists, it is described in the display sheet in a similar manner.

Next, at step 402, the sheet generation unit 214 generates an edit sheet for a table object. Specifically, a sheet with a description of table structure information is generated for each table (table-object units). In this case, if a plurality of table objects to be processed exists, the edit sheets may be sequentially generated in the arbitrary order or may be generated for all the table objects by parallel processing.

FIGS. 9A and 9B are exemplary edit sheets for a table object of the table region 502 and for a table object of the table region 503, respectively. For example, in the case of FIG. 9A, it is seen that the sheet name is "TableEditSheet1", information on size, line and the like is represented in cell form for cells arranged in three rows and three columns to form the table region 502, and the result of the character recognition is represented as a cell value. Likewise, in FIG. 9B, the sheet name is "TableEditSheet2", information on size, line and the like is represented in cell form for cells arranged in three rows and two columns to form the table region 503, and the result of the character recognition is represented as a cell value.

Then, at step 403, the sheet generation unit 214 determines whether or not edit sheets are generated for all the table objects, and the process goes to step 404 upon completion of the generation of the edit sheets for all the table objects.

At step 404, the sheet generation unit 219 generates a rendering object making reference to the table on each edit sheet generated at step 402, and adds the rendering object as reference information on the display sheet generated in step 401. In this regard, the rendering object is obtained by rendering the range designated on the edit sheet. When the table on the edit sheet for rendering is edited, the contents of the image object on the display sheet for reference is updated along with the contents after the edition.

FIG. 8B is an exemplary display sheet resulting from addition of the rendering object 801, which makes reference to the edit sheets (FIGS. 9A and 9B) of the table regions 502 and 503, to the display sheet (FIG. 8A) of the character region 501. Here, the contents of the Image element representing image data are a Script element, in which virtual Script language, which is made for explanation in the embodiment, is described.

This Workbook.Sheet("TableName").getRenderImage( ) is a script instruction to acquire a rendering image of TableName sheet in the same Workbook document. As a result, the rendering images of the two edit sheets (TableEditSheet1, TableEditSheet2) are placed on the display sheet.

(Workbook Document Generation Unit)

Upon completion of the sheet generation processing by the sheet generation unit 214, the workbook document generation unit 215 generates a workbook document on the basis of the generated sheets. Specifically, an electric document including a Workbook element, a Sheets element and a Sheet element in which the display sheet and the edit sheets are associated with each other is generated.

Here, each element will be described. The Workbook element which is a root element includes the Sheets element with a description of information on sheets which form themselves. Then, the Sheets element includes the sheet elements and the Sheet element makes reference to the display sheet or the edit sheet using the ref attribute.

FIG. 10 is an exemplary workbook document. The workbook document has the ref attribute values respectively storing file names "ViewSheet.xml", "TableEditSheet1.xml", and "TableEditSheet2.xml". It is understood from this that the workbook document in FIG. 10 is made up of the display sheet (FIG. 8B) subjected to the addition processing and the two edit sheets (FIGS. 9A and 9B).

In this manner, in relation to a paper document which is read out by the scanner 101, a workbook document is generated as an electronic document.

Figure 11:
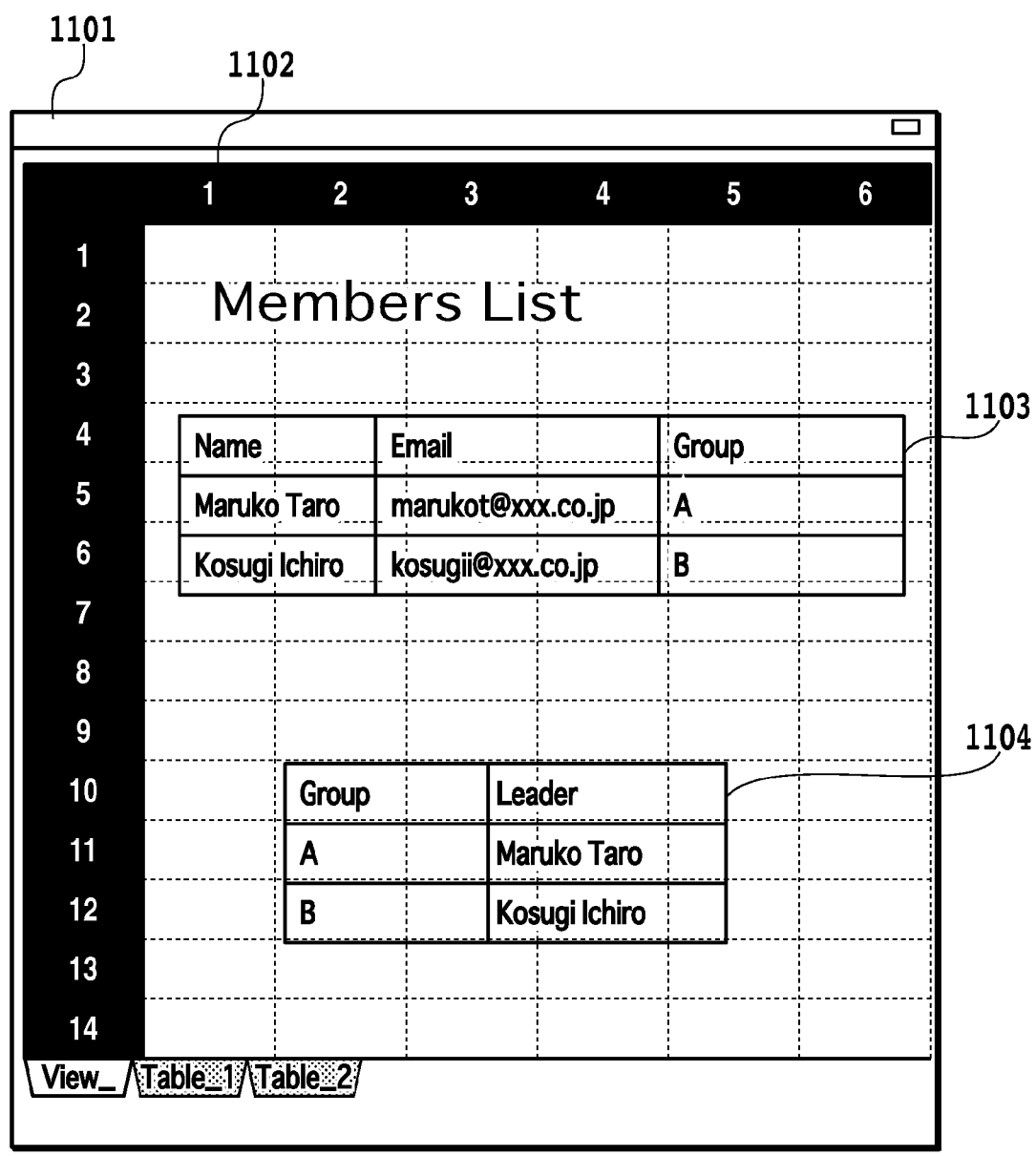
FIG. 11 is a diagram showing an exemplary display sheet displayed by a display/editing program.

FIG. 11 shows the state of the display of the PC 120 displaying the display sheet (FIG. 8B) subjected to the addition processing, by the display/editing program 121. Reference numeral 1101 denotes a display window and reference numeral 1102 denotes a sheet editing window.

Table images 1103 and 1104, which are arranged in free positions within the sheet editing window 1102, are the rendering images corresponding to the edit sheets in FIGS. 9A and 9B, respectively, in which a table position and a line position are displayed irrelevantly of the cells.

FIGS. 12A and 12B show the states of the display of the PC 120 displaying the edit sheets (FIGS. 9A and 9B) by the display/editing program 121. In FIG. 12A, a tab 1201 of Table. 1 is active, so that the edit sheet (FIG. 9A) corresponding to the table region 502 is displayed on the sheet editing window 1102. Likewise, in FIG. 12B, a tab 1202 is active, so that the edit sheet (FIG. 9B) corresponding to the table region 503 is displayed on the sheet editing window 1102. Unlike the case of the display sheet, the sheet is displayed such that the table position and the line position are matched with the rectangular shape of the cell.

When, on the screen, insertion/deletion of a row/column, editing of text in a cell, or the like is performed on the displayed table, the edited content is immediately reflected in the display sheet shown in FIG. 11.

As described above, in a workbook document as an electronic document generated according to the present invention, an actual data of a table is expressed on an edit sheet for each table. For this reason, even when a plurality of tables are included in the same page, the tables can be edited without affecting each other (that is, without a situation as described in FIG. 13B).

Figure 14:
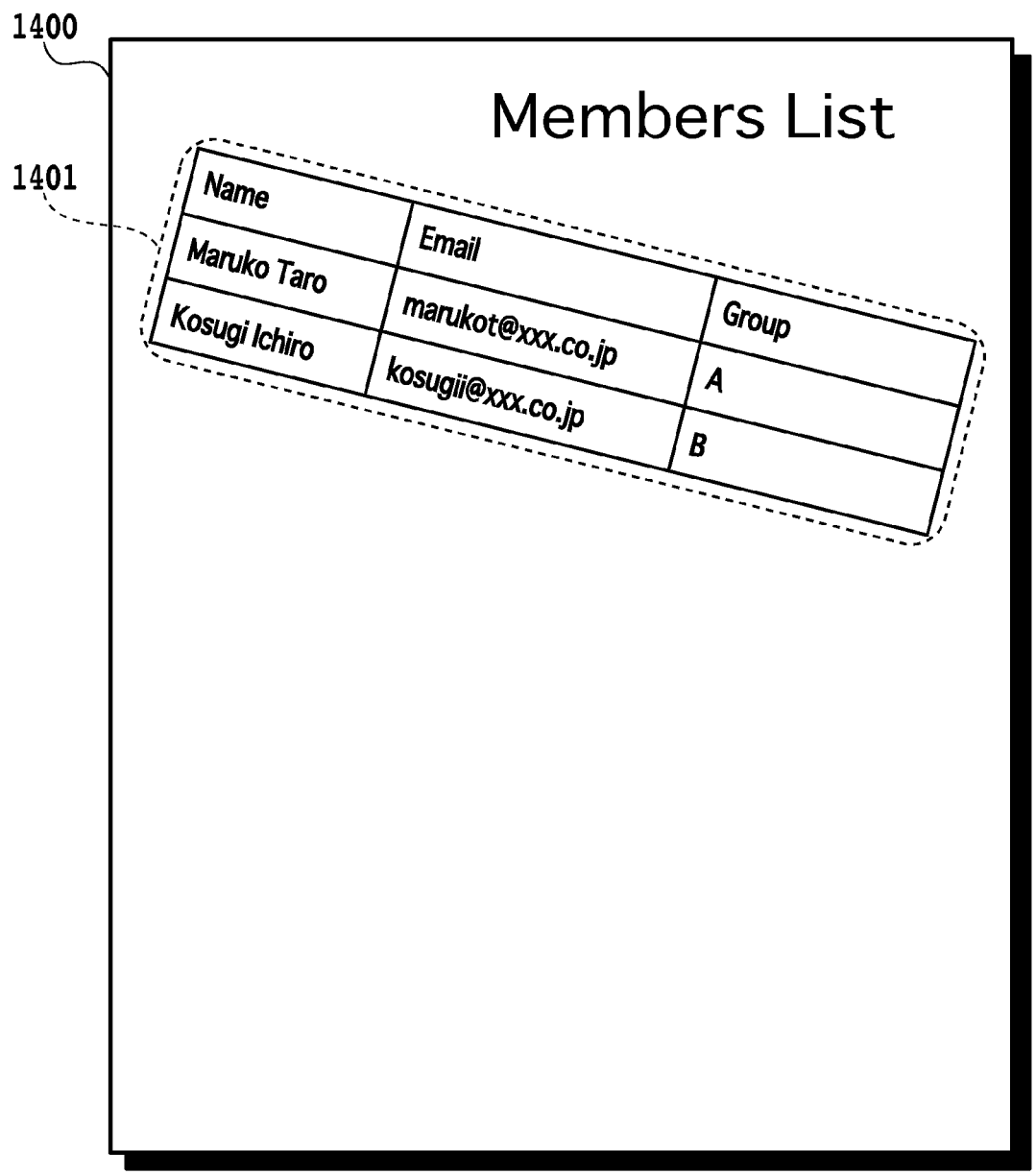
FIG. 14 is an exemplary document image.

Further, the processing when a document image 1400 shown in FIG. 14 is input will be described.

A table region 1401 on the document image 1400 is inclined about 15 degrees in a clockwise direction with respect to the vertical direction of the document. When the table is inclined as described above, in the related art, there is only one technique of expressing the table as a graphics object or the like without a row column structure, not as a table object having a row column structure.

However, in the present invention, such an inclined table can be expressed as a table object.

FIGS. 15A and 15B illustrate the states when an edit sheet obtained by application of the present invention to the document image 1400 and a display sheet subjected to the addition processing are displayed by the display/editing program.

As is clear from FIG. 15B, the table remains inclined about 15 degrees on the display sheet, and the overview of the document image 1400 is maintained without a change. On the other hand, in the edit sheet in FIG. 15A, the actual data of the table is expressed by the row column structure so as to enable the edit operation on the table. In addition, since the table on the display sheet is made reference to from the edit sheet as a rendering object, an operation of rotating the table, and the like are made possible.

As described above, with the image processing apparatus according to the embodiment, a paper document can be converted into an electronic document while both the editability of tables included in a document and the precious reproduction of the layout of the entire document can be achieved.

Embodiment 2

In embodiment 1 the edit sheet is generated for each table when the table region exists in the document image received through the scanner 101. However, even in the digitization of a document with the intention of editing tables, some tables in the document image may possibly not be required to be edited. To address this, the embodiment of generating an edit sheet only when it is required is described as embodiment 2.

Figure 16:
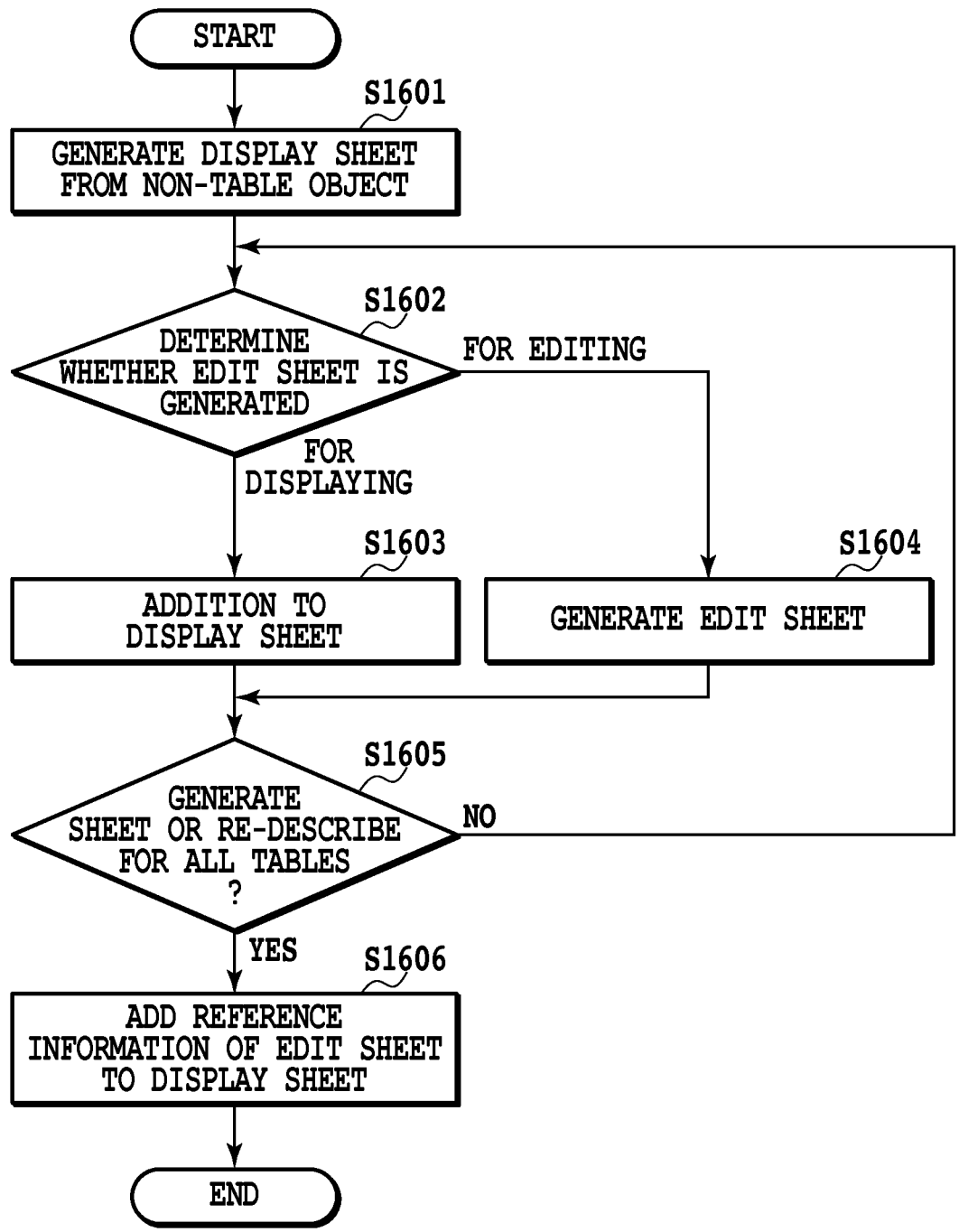
FIG. 16 is a flowchart illustrating the flow of processing in a sheet generating unit according to embodiment 2.

FIG. 16 is a flowchart showing the flow of processing in the sheet generation unit 214 according to the embodiment. The processing will be described below in detail along the flowchart, and a description of parts in common with those in the flowchart in FIG. 4 according to embodiment 1 is simplified or omitted. Differences from embodiment 1 are mainly described below.

First, at step 1601, the sheet generation unit 214 generates a display sheet in which objects other than a table object are described. This is similar to step 401.

Next, at step 1602, the sheet generation unit 214 determines whether or not an edit sheet is generated for a table object. Specifically, the sheet generation unit 214 uses a determination table in which predetermined conditions for generating the edit sheet are described to determine whether or not the table object fulfills the generation conditions. If it is determined that the table object fulfills the generation conditions, the process goes to step 1604. If it is determined that the table object does not fulfill the generation conditions, the process goes to step 1603.

FIG. 17 is a diagram showing an exemplary determination table. In the determination table shown in FIG. 17, whether or not an edit sheet should be generated is determined from the major three aspects, specification of a workbook document, a positional relationship with another object, and a positional relationship with another table.

In the condition relating to the specification of the workbook document, further, the condition is divided into two elements, inclination and cell background. The "inclination" is the condition that, when the inclination of the table with respect to the document is at any angle other than 0 degrees, 90 degrees, 180 degrees and 270 degrees, the edit sheet is generated. In other words, when the table is inclined at any angle other than at right angles (e.g., 30 degrees) with respect to the document, the edit sheet is generated. The "cell background" is the condition that, except when the background of the cell is a one-colored background, the edit sheet is generated. In other words, when the background of the cell is multicolored, the edit sheet is generated.

The condition relating to the positional relationship with another object is that, when the region of a table object is entirely or partially overlapped on an object other than a table, an edit sheet is generated.

The condition relating to the positional relationship with another table is that, when a plurality of tables exist, and the positional relationship between the tables gives rise to an overlapping in either the row direction or the column direction, an edit sheet is generated. In other words, when the tables are arranged in a positional relationship such that an operation of inserting/deleting a row/column and the like performed on one of tables may affect the other table, the edit sheet is generated.

In this regard, the above-described generation conditions for generating the determination table are described by way of example, and various conditions other than this can be set. For example, in other possible conditions, an edit sheet may be generated when X coordinates of the lines of the vertically arranged tables in the vertical direction are not aligned or when Y coordinates of the lines of the side-by-side arranged tables in the lateral direction are not aligned. In another possible condition, an edit sheet may be always generated when two tables or more exist. The conditions for generating a determination table may be arbitrarily set by a user according to his intended use or use application of a digitized document.

At step 1603, the sheet generation unit 214 additionally describes a table as a floating object on the display sheet generated at step 1601. Upon completion of the addition, the process goes to step 1605.

On the other hand, at step 1604, the sheet generation unit 214 generates the edit sheet for the table object. The concrete processes are similar to those in step 902. Upon completion of the generation of the edit sheet, the process goes to step 1605.

At step 1605, it is determined whether or not all the table objects have been added in the display sheet or the edit sheets have been generated for all the table objects. If the completion is determined, the process goes to step 1606.

At step 1606, the sheet generation unit 214 generates a rendering object with reference to the table on the edit sheet generated at step 1605, and then adds the rendering object on the display sheet generated at step 1603. This step is similar to step 404.

A specific example of using the determination table in FIG. 17 for application of the processing according to the embodiment will be described below.

Figure 18:
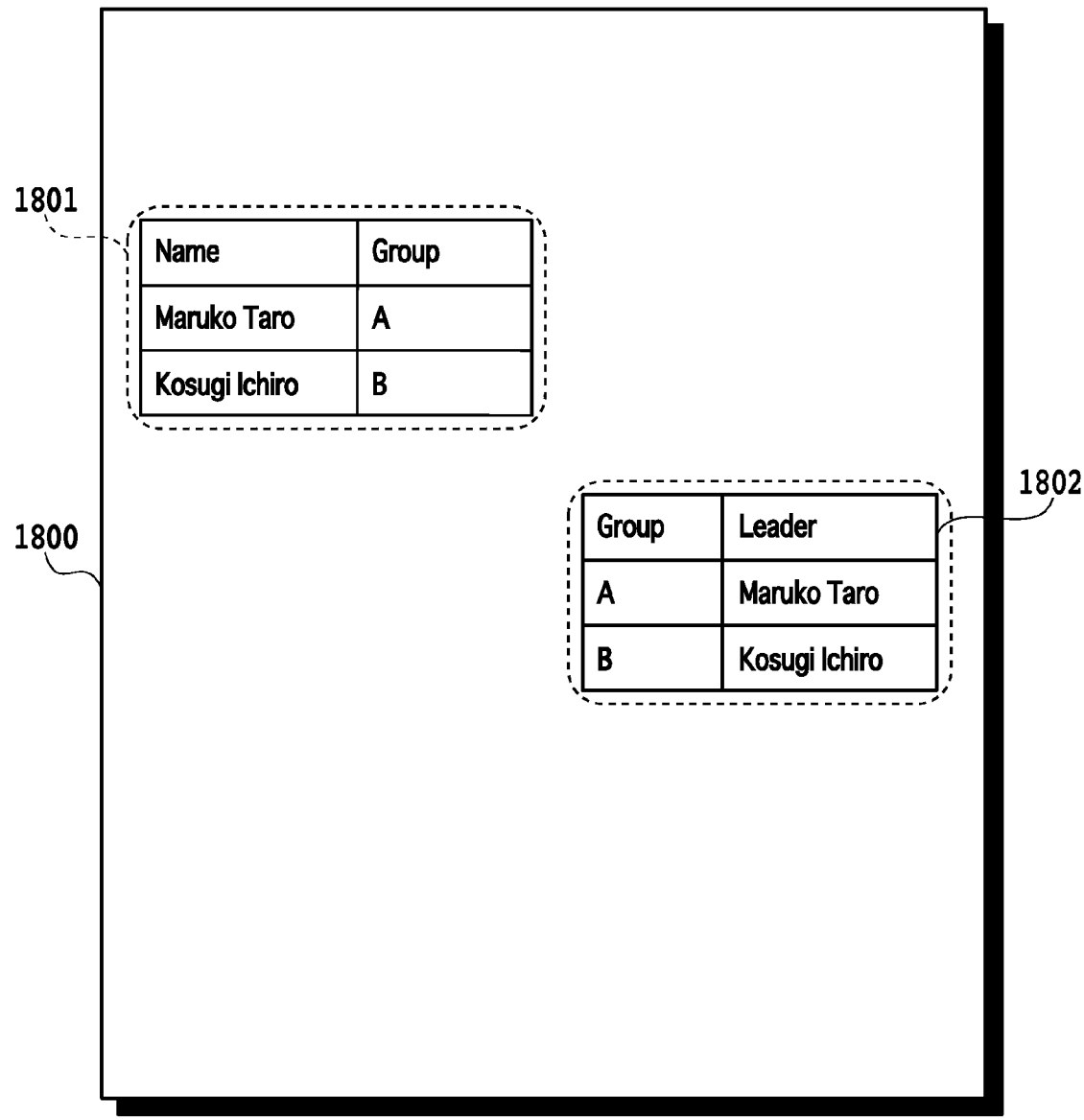
FIG. 18 is a diagram showing an exemplary document image.

First, an example of a document image 1800 shown in FIG. 18 will be described. In the document image 1800 in FIG. 18, two tables (1801 and 1802) located out of alignment in the up-down and right-left directions exist.

First, as in the case of embodiment 1, the region extraction unit 211 extracts region data as table objects for the table regions 1801 and 1802. Then, the region extraction unit 211 extracts various items of information relating to the table region 1801, (110, 600) as position information, (1100, 500) as size information and an inclined angle of 0 degrees. Likewise, for the table region 1802, (1350, 1400) is extracted as position information, (1000, 550) is extracted as size information and the inclined angle of 0 degree is extracted.

Subsequently, the table structure analysis unit 212 analyzes the table region data of the respective tables. In this case, RGB#FFF(white) is extracted for all the cells as information on the cell background color.

Then, the determination table in FIG. 17 is used to determine whether or not an edit sheet should be generated. First, in both the table regions 1801, 1802, there is no inclination, and the cell backgrounds are a one-colored background. For this reason, the tables 1801, 1802 do not fulfill the conditions for generating the edit sheet relating to specification of the workbook document. In addition, since there is no object other than the tables, the tables do not fulfill the generation condition relating to the position relationship with another object. Also, since the positional relationship between the two tables does not involve superimposing in the two directions of the X axis and the Y axis, the tables do not fulfill the generation condition relating to the position relationship with another table.

Accordingly, the edit sheet is not generated and the two tables are added in the display sheet, followed by termination of the processing of the sheet generation unit 214.

As a result, a workbook document including the display sheet alone is generated.

Next, an example of the document image 1400 shown in FIG. 14 will be described.

First, the region extraction unit 211 extracts region data as a table object for the table region 1401, and simultaneously extracts information representing an inclination of 15 degrees.

After having analyzed, the table structure analysis unit 212 uses the determination table in FIG. 17 to determine whether or not an edit sheet should be generated. In this case, since the table region 1401 is inclined 15 degrees, the table fulfills the conditions for generating the edit sheet in relation to the specification of the workbook document.

Thus, the edit sheet is generated and then a rendering object making reference to the table on the generated edit sheet is added in the display sheet, followed by termination of the processing of the sheet generation unit 214.

In consequence, a workbook document including the display sheet and the edit sheet is generated.

As described above, according to the embodiment, generation of an unnecessary edit sheet cam be inhibited by determining based on predetermined conditions whether or not an edit sheet should be generated. This makes it possible to digitize a paper document into an electronic document while responding to user's various needs.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001426, filed Jan. 6, 2010, which is hereby incorporated by reference herein in its entirety.

What is claimed is:

1. An apparatus for digitizing a document including a table, the apparatus comprising a processor and a memory, wherein the processor functions as:
a region extraction unit configured to extract region data containing details of regions occupied by table objects included in document image data;
a table structure analysis unit configured to analyze the region data relating to the table objects and to extract table structure information relating to the table objects;
a sheet generation unit configured to generate, based on the region data and the table structure information related to the table objects, a display spreadsheet for reproducing an appearance of the table objects in the document image data and edit spreadsheets for editing the table objects, each of the edit spreadsheets corresponding to each of the table objects, wherein the table structure information related to each of the table objects is represented using cells of the edit spreadsheets, and the display spreadsheet includes an instruction to place rendering images of the edit spreadsheets as floating objects on the display spreadsheet; and
an electronic-document generation unit configured to generate an electronic workbook document which can be displayed and edited by a spreadsheet application, the generated electronic workbook document including the display spreadsheet and the edit spreadsheets generated by said sheet generation unit as spreadsheets of the generated electronic workbook document, wherein the display spreadsheet is a spreadsheet different from the edit spreadsheets.

2. The apparatus according to claim 1, wherein, if at least one of the edit sheets is edited, at least one of the rendering objects placed as the floating objects on the display sheet is updated to reflect contents after the edit.

3. The apparatus according to claim 1, wherein the sheet generation unit further includes a determination unit configured to determine whether or not to generate the edit spreadsheets based upon whether or not a predetermined generation condition is fulfilled.

4. The apparatus according to claim 3, wherein the predetermined generation condition includes a condition relating to any of an angle of inclination of each table object with respect to the document, a color of a cell background, a positional relationship between the table objects and another object, and a positional relationship between the table objects.

5. The apparatus according to claim 1, wherein the region data includes information on at least one of positions of the table objects, sizes of the table objects, and inclinations of the table objects, and
wherein the table structure information includes information on at least one of a row/column structure, coordinates of cells, a line color and a line style.

6. The apparatus according to claim 1, wherein a format of the electronic-document is an XML format.

7. The apparatus according to claim 1, further comprising a character recognition unit configured to perform character recognition processing for character images included in the table objects to obtain character codes corresponding to the character images,
wherein the obtained character codes are represented as cell values in the edit spreadsheets by the sheet generation unit.

8. A method for digitizing a document including a table, the method comprising:
extracting region data containing details of regions occupied by table objects included in document image data;
analyzing the region data relating to the table objects and extracting table structure information relating to the table objects;
using the region data and the table structure information related to the table object to generate a display spreadsheet for reproducing an appearance of the table objects in the document image data and edit spreadsheets for editing the table objects, each of the edit spreadsheets corresponding to each of the table objects, wherein the table structure information related to each of the table objects is represented using cells of the edit spreadsheets, and the display spreadsheet includes an instruction to place rendering images of the edit spreadsheets as floating objects on the display spreadsheet; and
generating an electronic workbook document which can be displayed and edited by a spreadsheet application, the generated electronic workbook document including the generated display spreadsheet and the generated edit spreadsheets as spreadsheets of the generated electronic workbook document, wherein the generated display spreadsheet is a spreadsheet different from the generated edit spreadsheets.

9. A non-transitory computer-readable recording medium having computer-executable instructions for performing a method of digitizing a document including a table, the method comprising:
extracting region data containing details of regions occupied by table objects included in document image data;
analyzing the region data relating to the table objects and extracting table structure information relating to the table objects;
using the region data and the table structure information related to the table objects to generate a display spreadsheet for reproducing an appearance of the table objects in the document image data and edit spreadsheets for editing the table o objects, each of the edit spreadsheets corresponding to each of the table objects, wherein the table structure information related to each of the table objects is represented using cells of the edit spreadsheets, and the display spreadsheet includes an instruction to place rendering images of the edit spreadsheets as floating objects on the display spreadsheet; and generating an electronic workbook document which can be displayed and edited by a spreadsheet application, the generated electronic workbook document including the generated display spreadsheet and the generated edit spreadsheets as spreadsheets of the generated electronic workbook document, wherein the generated display spreadsheet is a spreadsheet different from the generated edit spreadsheets.

\* \* \* \* \*